US010373395B1

(12) United States Patent
Harned et al.

(10) Patent No.: US 10,373,395 B1
(45) Date of Patent: Aug. 6, 2019

(54) STICK-ON TICKET SYSTEM AND METHOD

(71) Applicant: Universal City Studios LLC, Universal City, CA (US)

(72) Inventors: Jessica Harned, Orlando, FL (US); Dennis Kelly, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 0 days.

(21) Appl. No.: 16/025,669

(22) Filed: Jul. 2, 2018

Related U.S. Application Data

(60) Provisional application No. 62/686,545, filed on Jun. 18, 2018.

(51) Int. Cl.
*G06K 7/10* (2006.01)
*G07B 1/00* (2006.01)
*G06K 7/14* (2006.01)
*G06K 19/06* (2006.01)

(52) U.S. Cl.
CPC .......... *G07B 1/00* (2013.01); *G06K 7/10297* (2013.01); *G06K 7/1413* (2013.01); *G06K 19/06028* (2013.01); *G06K 2007/10524* (2013.01)

(58) Field of Classification Search
CPC ............... G07B 1/00; G06K 19/06028; G06K 7/10297; G06K 7/1413; G06K 2007/10524
See application file for complete search history.

(56) References Cited

U.S. PATENT DOCUMENTS

| | | | |
|---|---|---|---|
| 6,426,707 B1 | 7/2002 | Prieto et al. | |
| 6,761,637 B2 | 7/2004 | Weston et al. | |
| 7,017,805 B2 | 3/2006 | Meehan | |
| 7,183,925 B2 | 2/2007 | Marshall et al. | |
| 7,188,764 B2 | 3/2007 | Penuela | |
| 7,204,425 B2 | 4/2007 | Mosher, Jr. et al. | |
| 7,425,898 B2 | 9/2008 | Ryckman | |
| 7,504,953 B2 | 3/2009 | Forster | |
| 7,540,413 B2 | 6/2009 | Meehan et al. | |
| 7,651,025 B2 | 1/2010 | Wu et al. | |
| 7,654,464 B2 | 2/2010 | Babine et al. | |
| 7,721,957 B2 | 5/2010 | Babine et al. | |
| 7,802,724 B1 | 9/2010 | Mohr | |
| 7,845,569 B1 | 12/2010 | Warther et al. | |

(Continued)

*Primary Examiner* — Sonji N Johnson
(74) *Attorney, Agent, or Firm* — Fletcher Yoder, P.C.

(57) ABSTRACT

A ticketing system includes a stick-on ticket, one or more stick-on ticket printers, and a stick-on ticket control system. The stick-on ticket includes a stick-on ticket carrier having a barcode disposed thereon and includes a sticker that has an identification tag and is configured to be removable from the stick-on ticket carrier and adhered to another surface. Each stick-on ticket printer is configured to read barcode information from the barcode to associate the barcode information with a user account and configured to read identification tag information from the identification tag, write identification tag information to the identification tag, or a combination thereof, to associate the identification tag with the user account such that the barcode and the identification tag are associated with the same user account. The stick-on ticket control system is configured to authenticate access to an amusement park based at least in part on the barcode information or the identification information read by the stick-on ticket reader.

20 Claims, 10 Drawing Sheets

(56) References Cited

U.S. PATENT DOCUMENTS

| | | |
|---|---|---|
| 7,850,527 B2 | 12/2010 | Barney et al. |
| 7,938,322 B2 | 5/2011 | Meehan |
| 8,006,899 B2 | 8/2011 | Wein |
| 8,016,194 B2 | 9/2011 | Hause et al. |
| 8,016,667 B2 | 9/2011 | Benbrahim |
| 8,027,872 B2 | 9/2011 | Graeber |
| 8,028,904 B2 | 10/2011 | Meehan et al. |
| 8,056,803 B2 | 11/2011 | Wen |
| 8,082,165 B2 | 12/2011 | Natsuyama et al. |
| 8,200,515 B2 | 6/2012 | Natsuyama et al. |
| 8,215,546 B2 | 7/2012 | Lin et al. |
| 8,253,533 B2 | 8/2012 | Jones |
| 8,275,312 B2 | 9/2012 | Fisher |
| 8,286,884 B2 | 10/2012 | Wilkinson |
| 8,346,580 B2 | 1/2013 | Nakfoor |
| 8,360,314 B2 | 1/2013 | Meehan et al. |
| 8,378,828 B2 | 2/2013 | Forster |
| 8,395,486 B2 | 3/2013 | Sajadi et al. |
| 8,424,716 B2 | 4/2013 | Hegan et al. |
| 8,425,314 B2 | 4/2013 | Benbrahim |
| 8,441,338 B2 | 5/2013 | Naressi et al. |
| 8,453,926 B2 | 6/2013 | Hunt |
| 8,472,046 B2 | 6/2013 | Hoffman et al. |
| 8,475,275 B2 | 7/2013 | Weston et al. |
| 8,544,758 B2 | 10/2013 | Wilkinson |
| 8,674,805 B2 | 3/2014 | Charych |
| 8,833,664 B2 | 9/2014 | Choi |
| 8,857,724 B2 | 10/2014 | Wilkinson |
| 8,949,146 B2 | 2/2015 | Fisher |
| 8,972,048 B2 | 3/2015 | Canora et al. |
| 9,031,611 B2 | 5/2015 | Fisher |
| 9,037,513 B2 | 5/2015 | Rosenblatt et al. |
| 9,038,896 B2 | 5/2015 | Williams et al. |
| 9,053,313 B2 | 6/2015 | Hart et al. |
| 9,109,763 B1 | 8/2015 | Wein |
| 9,231,290 B2 | 1/2016 | Forster et al. |
| 9,275,322 B2 | 3/2016 | Mei et al. |
| 9,286,592 B2 | 3/2016 | Denker et al. |
| 9,317,818 B1 | 4/2016 | Sarvestani et al. |
| 9,373,204 B1 | 6/2016 | Moore, Jr. et al. |
| 9,471,868 B2 | 10/2016 | Dancausse et al. |
| 9,474,137 B1 | 10/2016 | Wein |
| 9,477,820 B2 | 10/2016 | Levin et al. |
| 9,489,466 B2 | 11/2016 | Costantino et al. |
| 9,513,666 B2 | 12/2016 | Li et al. |
| 9,582,952 B1 | 2/2017 | Brillante et al. |
| 9,594,992 B1 | 3/2017 | Lai |
| 9,710,979 B2 | 7/2017 | Moore, Jr. et al. |
| 9,833,294 B2 | 12/2017 | Franjic et al. |
| 9,836,627 B2 | 12/2017 | Grimaux |
| 9,836,688 B2 | 12/2017 | Dancausse et al. |
| 9,861,289 B2 | 1/2018 | Li et al. |
| 9,865,106 B2 | 1/2018 | Maor |
| 9,881,433 B2 | 1/2018 | Bergdale et al. |
| 9,913,344 B2 | 3/2018 | Lu et al. |
| 9,946,977 B2 | 4/2018 | Brillante et al. |
| 9,971,917 B2 | 5/2018 | Duckett et al. |
| 9,993,203 B2 | 6/2018 | Mei et al. |
| 9,996,789 B2 | 6/2018 | Costantino et al. |
| 2002/0065783 A1 | 5/2002 | Na et al. |
| 2004/0034546 A1 | 2/2004 | Lauper et al. |
| 2005/0240453 A1* | 10/2005 | Lyons .................... G06Q 10/02 705/5 |
| 2006/0131391 A1* | 6/2006 | Penuela .................. G09F 3/005 235/380 |
| 2007/0008138 A1 | 1/2007 | Mosher, Jr. et al. |
| 2007/0083381 A1 | 4/2007 | Farrell et al. |
| 2007/0158412 A1 | 7/2007 | Kang et al. |
| 2008/0270305 A1 | 10/2008 | Andreasson et al. |
| 2009/0090772 A1 | 4/2009 | Lee |
| 2009/0124354 A1 | 5/2009 | Acres |
| 2010/0070312 A1 | 3/2010 | Hunt |
| 2010/0161403 A1 | 6/2010 | Fisher et al. |
| 2010/0171616 A1 | 7/2010 | Walliser |
| 2012/0290336 A1 | 11/2012 | Rosenblatt et al. |
| 2012/0300087 A1* | 11/2012 | Shore .................... G06Q 10/10 348/207.1 |
| 2013/0084798 A1 | 4/2013 | Faithorn |
| 2013/0127616 A1 | 5/2013 | Robitaille |
| 2013/0159027 A1 | 6/2013 | Naor et al. |
| 2013/0206841 A1 | 8/2013 | Cairns |
| 2013/0218612 A1 | 8/2013 | Hunt |
| 2014/0095219 A1 | 4/2014 | Zises |
| 2014/0201086 A1 | 7/2014 | Gadotti et al. |
| 2014/0365370 A1 | 12/2014 | Huang et al. |
| 2015/0046202 A1 | 2/2015 | Hunt |
| 2015/0083803 A1 | 3/2015 | Herron et al. |
| 2015/0084741 A1 | 3/2015 | Bergdale et al. |
| 2015/0193765 A1 | 7/2015 | Gadotti |
| 2015/0294515 A1 | 10/2015 | Bergdale et al. |
| 2015/0356465 A1 | 12/2015 | Levine et al. |
| 2016/0004952 A1 | 1/2016 | Mei |
| 2016/0104062 A1 | 4/2016 | Costantino et al. |
| 2016/0148438 A1 | 5/2016 | Johnson |
| 2016/0188547 A1 | 6/2016 | Cruzada |
| 2016/0189020 A1 | 6/2016 | Duckett et al. |
| 2016/0203663 A1 | 7/2016 | Proctor |
| 2016/0247145 A1 | 8/2016 | Grimaux |
| 2016/0292558 A1 | 10/2016 | Vienneau et al. |
| 2016/0317057 A1 | 11/2016 | Li et al. |
| 2017/0098337 A1 | 4/2017 | Galley et al. |
| 2017/0200073 A9 | 7/2017 | Duckett et al. |
| 2017/0270734 A1 | 9/2017 | Geraghty et al. |
| 2017/0308692 A1 | 10/2017 | Yano |
| 2017/0323499 A1 | 11/2017 | Moore et al. |
| 2017/0372187 A1* | 12/2017 | Costantino ........ G06F 17/30879 |
| 2018/0025193 A1 | 1/2018 | Grimaux |
| 2018/0041859 A1 | 2/2018 | Forster |
| 2018/0053025 A1 | 2/2018 | Grimaux |
| 2018/0071042 A1 | 3/2018 | Franjic et al. |

* cited by examiner

“STICK-ON TICKET SYSTEM AND METHOD”

CROSS-REFERENCE TO RELATED APPLICATIONS

The present application claims the benefit of U.S. Provisional Application No. 62/686,545, entitled "STICK-ON TICKET SYSTEM AND METHOD" and filed Jun. 18, 2018, the disclosure of which is incorporated herein by reference for all purposes.

FIELD OF DISCLOSURE

The present disclosure relates generally to the field of amusement parks. More specifically, embodiments of the present disclosure relate to ticketing systems and methods for authenticating access to amusement parks, events, and attractions.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various ticketing techniques have been used in amusement parks or similar entertainment facilities to authenticate guests' access to the amusement parks. However, current techniques may be inconvenient and/or inefficient. For example, it is time-consuming and manually intensive using a multi-step process of linking a purchased ticket or entitlement with an integrated device, which enables access to the amusement parks. In addition, these integrated devices may be costly to replace or repair if lost or damaged. Accordingly, it may be desirable to provide efficient systems and methods for authenticating access to the amusement parks or attractions.

SUMMARY

Certain embodiments commensurate in scope with the originally claimed subject matter are summarized below. These embodiments are not intended to limit the scope of the disclosure. Indeed, the present disclosure may encompass a variety of forms that may be similar to or different from the embodiments set forth below.

In accordance with one aspect of the present disclosure, a ticketing system includes a stick-on ticket, one or more stick-on ticket printers, and a stick-on ticket control system. The stick-on ticket includes a stick-on ticket carrier and a sticker including an identification tag and an adhesive layer, wherein the sticker is configured to be removable from the stick-on ticket carrier and adhered to another surface. The stick-on ticket also includes a barcode disposed on the stick-on ticket carrier. Each stick-on ticket printer of the one or more stick-on ticket printers includes a barcode reader configured to read barcode information from the barcode to associate the barcode information with a user account. Each stick-on ticket printer includes an identification tag reader configured to read identification tag information from the identification tag, write identification tag information to the identification tag, or a combination thereof, to associate the identification tag with the user account such that the barcode and the identification tag are associated with the same user account. Each stick-on ticket printer also includes communication circuitry configured to communicate the barcode information and the identification tag information. The stick-on ticket control system is coupled to the one or more stick-on ticket printers wherein the stick-on ticket control system stores instructions that, when executed, are configured to cause the stick-on ticket control system to receive the barcode information and the identification tag information from the one or more stick-on ticket printers; store the barcode information and the identification tag information in association with the user account; receive the barcode information or the identification tag information from a stick-on ticket reader associated with an amusement park; and authenticate access to the amusement park based at least in part on the barcode information or the identification information read by the stick-on ticket reader.

In accordance with another aspect of the present disclosure, a method of ticketing includes receiving a stick-on ticket request for a stick-on ticket and associating a barcode and an identification tag of the stick-on ticket with a user to generate an associated stick-on ticket. The method includes providing the associated stick-on ticket to the user. The method includes reading information from the stick-on ticket at an attraction, wherein the information is associated with the user. The method also includes authenticating access to the attraction based at least in part on the information.

In accordance with another aspect of the present disclosure, a stick-on ticket printer configured to print stick-on tickets includes a printer configured to print a barcode on a stick-on ticket carrier. The stick-on ticket printer includes a barcode reader configured to read the barcode to acquire barcode information and an identification tag reader configured to read an identification tag of a sticker associated with the stick-on ticket carrier to acquire identification tag information. The stick-on ticket printer includes a processor configured to receive user information and associate the user information with the barcode information and the identification tag information to generate stick-on ticket information. The stick-on ticket printer also includes communication circuitry configured to send the stick-on ticket information to a stick-on ticket control system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
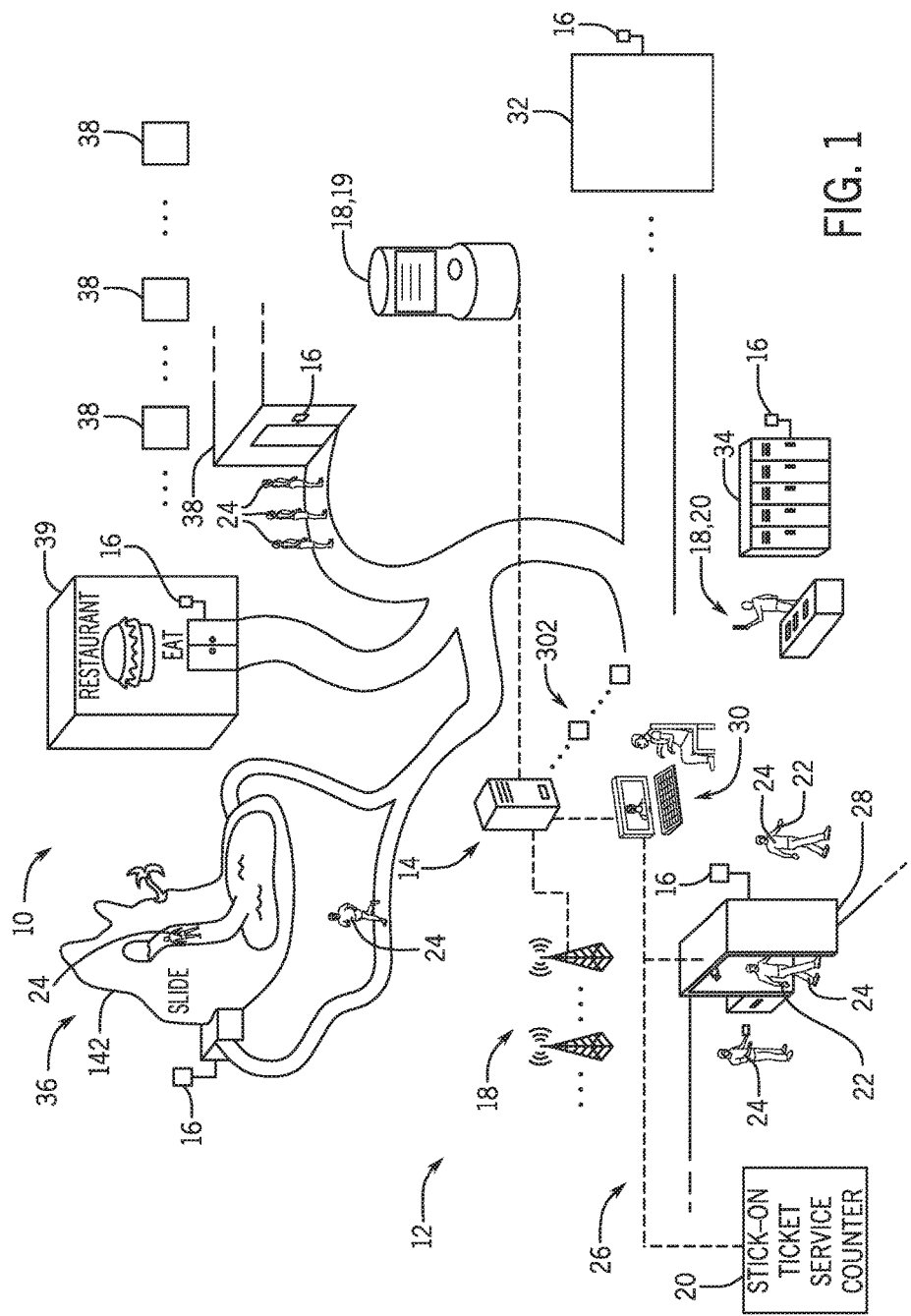
FIG. 1 is a schematic view of an amusement park including a stick-on ticket ticketing system, in accordance with present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

The present disclosure relates to a stick-on ticket ticketing system for efficiently providing and authenticating access to an amusement park. As provided herein, a stick-on ticket may refer to an access ticket that includes a sticker component including wireless communication circuitry that is coupled to and removable from a carrier component. The sticker component and/or the carrier component may be used to access various attractions within the amusement park, thus providing a measure of redundancy. That is, the wireless communication circuitry of the sticker is capable of facilitating communication with various access points within the amusement park to permit attraction entry or other types of interactions. However, the user may in some instances prefer to use a more traditional paper ticket. In such cases, the portion of the carrier component of the stick-on ticket that remains when the sticker is removed may include a barcode or other readable element that can be recognized by the access points, e.g., via readers integrated into the access points. In this manner, more technology-averse users may be provided with traditional tickets that can be used in familiar ways, either with the sticker removed or in place. Further, users more comfortable with using new types of access devices, such as stickers with wireless communication capabilities, may have the option to use such stickers for more convenient and hands-free entry to attractions (or other types of park interactions). In this manner, upgraded access technologies may be slowly phased in for guests in the amusement park. Yet another benefit is that, because the users may retain the carrier component including the barcode after applying the sticker, inadvertent loss of the sticker does not prevent access to the attractions. Accordingly, both the barcoded portion and the sticker may remain with their associated user. For example, while the sticker may be applied to the user's hand, the remaining barcoded portion of the stick-on ticket may be stored in a pocket or purse. If the sticker becomes damaged or lost, the user may retrieve the barcoded portion to gain access to desired attractions.

Upon purchase by a user, the stick-on ticket ticketing system may generate a stick-on ticket that is associated or linked to the user's account or profile. The associating of the stick-on ticket associates both the wireless communication circuitry of the sticker as well as the readable element with the same user. The user may peel off a sticker of the stick-on ticket and adhere the sticker on a hand, an arm, any other suitable portion of a body, or any suitable object (e.g., clothes, hat, mobile device, mobile phone). The sticker allows the user to enter the amusement park and/or access participating amusement park areas inside the amusement park (e.g., access authentication, contactless payment functions, tap to pay). The disclosed techniques may be used in conjunction with post-park services outside the amusement park. In particular, each stick-on ticket is associated or linked to a user account or profile on a technology platform, where payment information is linked for purchasing access into the amusement park, participating amusement park areas inside the amusement park, post-park services outside the amusement park, or a combination thereof. Accordingly, the stick-on ticket ticking system provides more efficient systems and methods for authenticating access. The user need not go through cumbersome ticket purchasing and authenticating processes and need not worry about losing the ticket, which in turn facilitates a more enjoyable amusement park experience. In addition, the stick-on ticket itself may include selectable and/or customizable designs that are associated with park narratives.

FIG. 1 is a schematic representation of an amusement park 10 including a stick-on ticket ticketing system 12, in accordance with present embodiments. The stick-on ticket ticketing system 12 includes a stick-on ticket control system 14, one or more stick-on ticket readers 16, one or more stick-on ticket service counters 18 (e.g., kiosks 19, service counters 20 providing in-person customer services), stick-on tickets 22, and other components that coordinate in accordance with present embodiments, as will be described in detail below. Present embodiments facilitate convenient access authentication that amusement park guests or users 24 can use the stick-on tickets 22 to enter various attractions or events in the amusement park 10. Present embodiments may also enable the users 24 to use the stick-on tickets 22 for making purchases inside and/or outside the amusement park 10 (e.g., contactless payment functions, tap to pay). As provided herein, reference to the stick-on ticket 22 may include configurations in which the sticker component and the carrier component are retained as one unit or in which the sticker component has been removed from the carrier component and is worn on or near the body. Further, as provided herein, the one or more stick-on ticket readers 16 may be implemented as tap points or readers. The stick-on ticket readers 16 may be implemented as part of park entrances/exits, attraction entrances/exits, retail checkout, event entrances/exits, interactive elements, or as part of handheld devices carried by mobile operators.

As an example, when the guests or users 24 arrive at a ticketing location 26 (e.g., hotel front desk, kiosk, guest service counter, park gate), the users 24 may purchase and be provided with entry entitlements (e.g., the stick-on tickets 22) among other items, such as a park map, stick-on ticket ticketing instructions, and amenities instructions. The ticketing location 26 may include the stick-on ticket service counter 18 (e.g., a service counter, a kiosk) to provide the stick-on tickets 22 to the users 24 upon valid purchases. The users 24 having the stick-on ticket 22 may enter the amusement park 10 via an entryway 28. As illustrated in FIG. 1, the entryway 28 may, in certain embodiments, exclude a physical turnstile or similar physical traversal counting or control features that can provide an impediment to traversal of the entryway 28 when the entryway 28 is intended to be open. That is, the entryway 28 may be turnstile-less during operation. The users 24 having the stick-on tickets 22 may be provided essentially hands-free access to the amusement park 10. For example, the one or more stick-on ticket readers 16 may authenticate access of the users 24 as the users 24 walk through the entryway 28 without stopping. Upon entrance into the amusement park 10, the users 24 may also use the stick-on tickets 22 to access or participate in various activities in different amusement park areas. For example, a user 24 may use the stick-on ticket 22 to access participating amusement areas 32 including a locker facility 34, water slide(s) 36, various rides or shows 38, restaurant(s) or food court(s) 39, various shops, etc.

In some embodiments, upon entrance into the amusement park 10, the users 24 may receive assistance and/or services relating to usage of their stick-on tickets 22 at the one or more stick-on ticket service counters 18 (e.g., the kiosk 19, the service counter 18 providing in-person customer services). For example, in cases that the stick-on ticket 22 does not function properly or the stick-on ticket 22 is lost, the user 24 may receive assistance or service from one of the in-park stick-on ticket service counters 18 without having to go back to the stick-on ticket service counter 18 at the ticketing location 26 by the entryway 28. In some embodiments, the users 24 wearing the stick-on tickets 22 may receive promotions and/or services selectively provided to the stick-on ticket users 24. In some embodiments, the access of the stick-on tickets 22 worn by the users 24 will be tracked and provided to a monitoring facility 30 that may be monitored by a park employee (e.g., a security service company).

Figure 2:
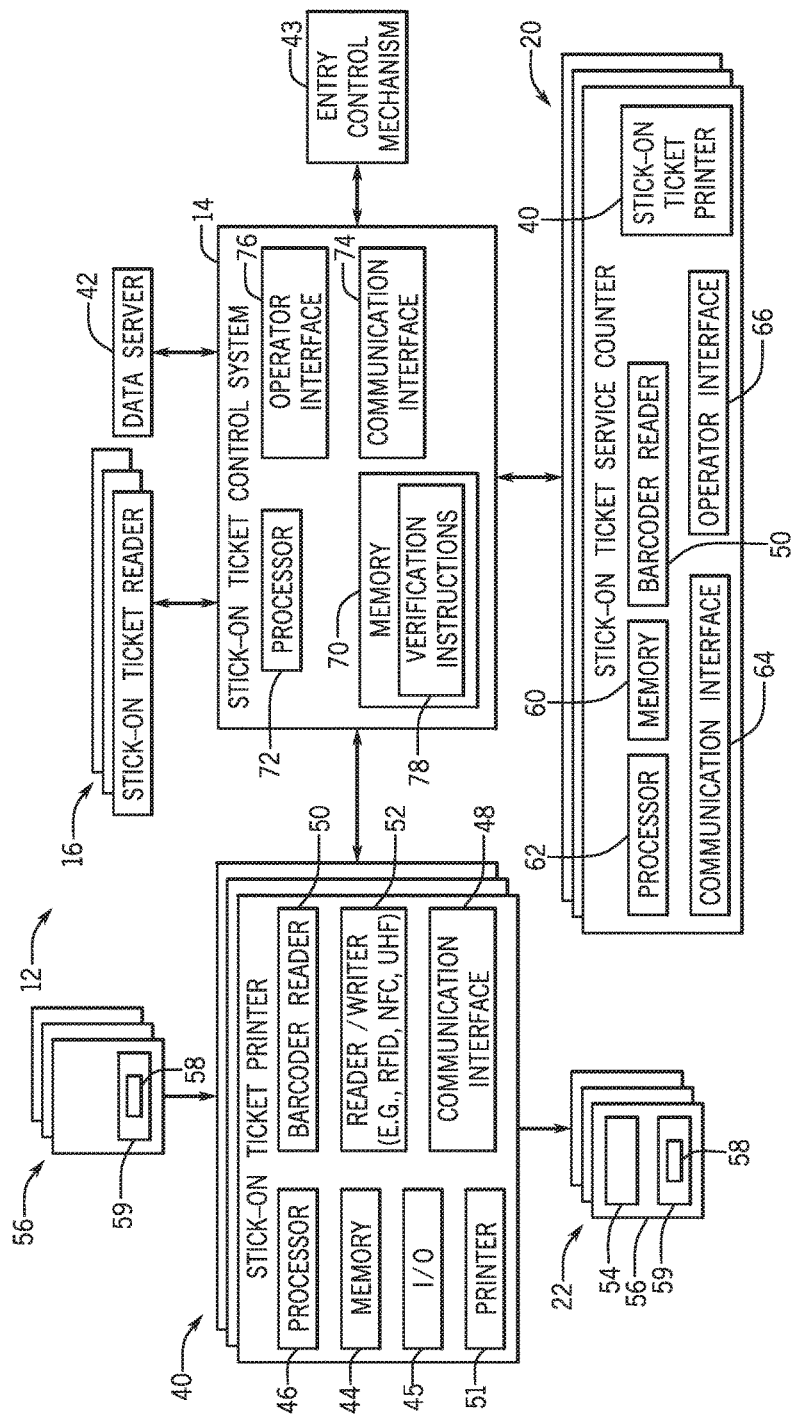
FIG. 2 is a block diagram of the stick-on ticket ticketing system of FIG. 1, in accordance with present embodiments.

FIG. 2 is a block diagram of the stick-on ticket ticketing system 12 of FIG. 1, in accordance with present embodiments. The stick-on ticket ticketing system 12 includes the stick-on ticket control system 14 communicatively and/or operatively coupled to one or more stick-on ticket printers 40, the one or more stick-on ticket readers 16, the one or more stick-on ticket service counters 18, a data server or platform 42, and one or more entry control mechanisms 43 (e.g., mechanisms that control open or close of the entryway 28 and/or other entryways to the participating amusement areas 32). The data server 42 may be an on-site data server at the amusement park 10 or may be remote data server. The data server 42 may store information of the users 24 relating to the user account, user profile, payment information, etc. For example, this user information may be received by the stick-on ticket control system 14 and stored in the data server 42 when the users 24 purchase the stick-on tickets 22.

Each of the one or more stick-on ticket printers 40 is configured to generate or print the stick-on tickets 22. The stick-on ticket printer 40 includes a, input/output device 45 to permit an operator to enter user information; a memory 44 that stores instructions (e.g., software, application) and a processor 46 configured to execute these instructions to control various components of the stick-on ticket printer 40. The stick-on ticket printer 40 includes a communication interface 48 (e.g., any suitable wired or wireless communication circuitry) to enable communication between the various components of the stick-on ticket printer 40 and communication with the stick-on ticket control system 14. The printer 40 includes a barcode reader 50 and an identification tag reader and/or writer 52. The identification tag reader/writer may be configured to communicate with wireless communication circuitry (e.g., RFID, NFC, UHF) and may have read/write capabilities.

The barcode reader 50 is configured to read or scan a barcode 54 on stick-on ticket carriers 56 of the stick-on tickets. The barcode 54 is configured to permit the respective stick-on ticket 22 to be linked or associated with the user account, profile, and/or payment information of the user 24. The barcode 54 may be data matrix or quick response code (QR code) in one-dimensional (1D) or two-dimensional (2D) variants. In some embodiments, the barcode reader 50 may be integrated within the stick-on ticket printer 40, such that generation of the stick-on ticket 22 and association of the stick-on ticket 22 to the user account, profile, and/or payment information are done in substantially one step (e.g., generation of stick-on ticket 22). Further, in one embodiment, the barcode reader 50 may be internal and/or not accessible from the outside of the stick-on ticket printer 40. In some embodiments, the barcode reader 50 may be a separate device coupled to the stick-on ticket printer 40 (e.g., a hand-held barcode reader). In some embodiments, a mobile device (e.g., mobile phone, smart phone) having suitable application software (app) may function as the barcode reader 50, and the user 24 may scan the barcode 54 to associate the stick-on ticket 22 with the user account, profile, or payment information. In some embodiments, the barcodes 54 are pre-printed already on the stick-on ticket carriers 56 before the stick-on ticket carriers 56 are loaded into the stick-on ticket printer 40. In some embodiments, the stick-on ticket printer 40 may include a printer 51 configured to printer on the stick-on ticket carrier 56 to print the barcodes on the stick-on ticket carriers 56 either before, during, or after association of the sticker 59 with the same user as the barcode 54. The printer 51 may also print additional information on the stick-on ticket (time, date, additional design features, etc.). In certain embodiments, the printer 51 may be configured to print on the portion of the stick-on ticket carrier 56 outside of the sticker 59 and directly on the sticker 59.

In one embodiment, the stick-on ticket printer 40 is configured to be used in conjunction with stick-on ticket carrier stock provided with integral identification tags 58. The printer 51 may also print the barcode 54 onto the stick-on ticket 22, and the identification tag reader/writer 52 may be programmed to print the barcode onto areas of the stick-on ticket carrier 56 that are positioned outside the boundaries of the removable sticker 59. Insofar as the sticker 59 may be associated with a particular graphical appearance or design, the printer 51 may, in certain embodiments, print the design onto the sticker 59 and/or the stick-on ticket carrier 56. The stick-on ticket carrier stock may also be provided with pre-scored or pre-cut stickers 59 (and/or scoring between individual stick-on tickets 22), such that the stickers 59 are provided at a regular interval on the stock and such that the identification tags 58 are fully within the boundaries of the pre-cut stickers 59. In some embodiments, the stick-on ticket printer 40 may be configured to print both the barcode 54 and the identification tag 58 on or within the stickers 59 of the stick-on ticket 22. That is, rather than being fed stock with integral identification tags 58, the wireless communication circuitry of the identification tags 58 may also be printed on demand.

The identification tag reader/writer 52 is configured to associate the identification tag 58 of each stick-on ticket 22 with a particular user. The identification tag 58 may be a radio frequency identification (RFID) tag, a near field communication (NFC) tag, or any other suitable tag configured to be read by the one or more stick-on ticket readers 16 (e.g., a RFID reader or a NFC reader) for identification and tracking of the stick-on ticket 22. In addition, the identification tag 58 may feature combinations of tags to facilitate different types of communication capabilities. In one embodiment, the identification tag 58 may include an ultra-high frequency (UHF) antenna and near field communication antenna implemented within a single tag to permit both medium and short range communication. In certain embodiments, the identification tag 58 may be a passive or powerless tag. In another embodiment, the identification tag 58 may receive power from a reader (e.g., an identification tag reader/writer 52, a stick-on ticket reader 16) The identification tag 58 may be a read-only tag (e.g., an assigned serial number or alphanumeric code if used as a key into a database), wherein the identification tag reader 52 is configured to scan an individual identification tag 58 to retrieve the assigned code in a memory of the identification tag 58, which is then associated to a particular user by storing the code as part of a user's profile in a memory 70 of the stick-on ticket control system 14. The identification tag 58 may be a read/write tag (e.g., object-specific data can be written into the tag by a system user). That is, the identification tag reader/writer 52 is configured to write onto a memory of the identification tag 58 to associate the identification tag 58 with a particular user. For example, an identification code (e.g., an alphanumeric code) associated with a particular user may be written onto the memory of the identification tag 58 to associate the identification tag 58 with the user. In either case, association of the identification tag 58 of the sticker 59 and the barcode 54 of a single stick-on ticket 22 with the same user may also associate the user's entitlements, such that any VIP status or other user profile information may also be accessed and presented via the identification tag 58 or the barcode 54.

The stick-on ticket printer 40 may load stocks of stick-on ticket carriers 56, read the barcode 54 via the barcode reader 50, and read and/to write to the identification tags 58 to generate stick-on tickets 22 associated with a particular user. Once associated, stick-on ticket information that includes a user identifier and the barcode and identification tag information may be provided to the stick-on ticket control system 14 for storage and to facilitate park interactions. In some embodiments, the stick-on ticket printer 40 may be configured to read the barcode 54 substantially simultaneously to associating the identification tag 58 (e.g., the barcode reader 50 is integrated within the stick-on ticket printer 40). In some embodiments, the barcode reader 50 may not be integrated within the stick-on ticket printer 40, and the barcode 54 may be read at a later time after the stick-on ticket 22 has been generated.

The stick-on ticket service counter 18 is configured to provide stick-on ticket-related assistance and/or services to the users 24. The stick-on ticket service counter 18 includes a memory 60 that stores instructions (e.g., software, application) and a processor 62 configured to execute these instructions to control various components of the stick-on ticket service counter 18. The stick-on ticket service counter 18 includes a communication interface 64 (e.g., any suitable wired or wireless communication) to enable communication between the various components of the stick-on ticket service counter 18 and communication with the stick-on ticket control system 14. The stick-on ticket service counter 18 includes an operator interface 66 (e.g., a computer-based workstation or device, an input/output interface, a display). The stick-on ticket service counter 18 may also include the stick-on ticket printer 40 and the barcode reader 50. In some embodiments, if the identification tag 58 of the stick-on ticket 22 does not function properly or the stick-on ticket 22 or the identification tag 58 of the stick-on ticket 22 is lost, the barcode 54 remaining on the stick-on ticket carrier 56 may be read by the barcode reader 50 at the stick-on ticket service counter 18. Based on information read from the barcode reader 50, the stick-on ticket control system 14 may verify the entitlements, user account, profile, or payment information of the user 24. Upon verification of the entitlements, user account, profile, or payment information of the user 24, the stick-on ticket service counter 18 may generate a replacement for the stick-on ticket 22 (e.g., replacement stick-on ticket 22) using the stick-on ticket printer 40.

The stick-on ticket control system 14 may be a remote system or may be located on-site at the amusement park 10. The stick-on ticket control system 14 includes a memory 70 that stores instructions (e.g., software, application) and a processor 72 configured to execute these instructions to control various components of the stick-on ticket control system 14, the various components of the stick-on ticket ticketing system 12 (e.g., the one or more stick-on ticket printers 40, the one or more stick-on ticket readers 16, the data server 42, the one or more stick-on ticket service counters 18), and/or some components of the amusement park 10 (e.g., components that allow or deny entrances into the amusement park 10 and/or the participating amusement park areas 32). The stick-on ticket control system 14 includes a communication interface 74 (e.g., any suitable wired or wireless communication) to enable communication between the various components of the stick-on ticket control system 14, communication with the various components of the stick-on ticket ticketing system 12, and communication with the one or more entry control mechanisms 43 (e.g., mechanisms that control open or close of the entryway 28 and/or other entryways to the participating amusement areas 32). The stick-on ticket control system 14 may include an operator interface 76 (e.g., a computer-based workstation or device, an input/output interface, a display).

In general, the stick-on ticket control system 14 may receive, analyze, and coordinate information from the various components of the stick-on ticket ticketing system 12 to generate and track usage of the stick-on tickets 22. In some embodiments, the stick-on ticket control system 14 may include a verification instructions 78 to determine generation and/or authentication of the stick-on tickets 22. The verification instructions 78 may include rules to generate and authenticate the stick-on tickets 22 to ensure that only one stick-on ticket 22 per authenticated user 24 is active or in-use. For example, the rules may include authenticating ownership of the stick-on ticket 22 (e.g., verifying a valid purchase or payment information, scanning the barcode 54, or verifying ownership by any other suitable method) before generating a replacement stick-on ticket 22 for an authenticated user 24. The rules may include analyzing information received from the one or more stick-on ticket readers 16 and/or the one or more stick-on ticket service counters 18 to ensure that the stick-on ticket 22 is not stolen or misused by an unauthorized user, before generating a replacement stick-on ticket 22. The rules may include deactivating or de-associating access using the identification tag 58 of a lost stick-on ticket 22 before generating a replacement stick-on ticket 22 for an authenticated user 24. The rules may include deactivating or de-associating access using the identification tag 58 at a pre-determined time. The pre-determined time may be a time period (e.g., hours, days) from the time of purchasing the stick-on ticket 22, a time period (e.g., hours, days) from the time of the first usage (e.g., read by the stick-on ticket reader 16) of the stick-on ticket 22, at closing of the amusement park 10, at the end of the day, etc.

Figure 3:
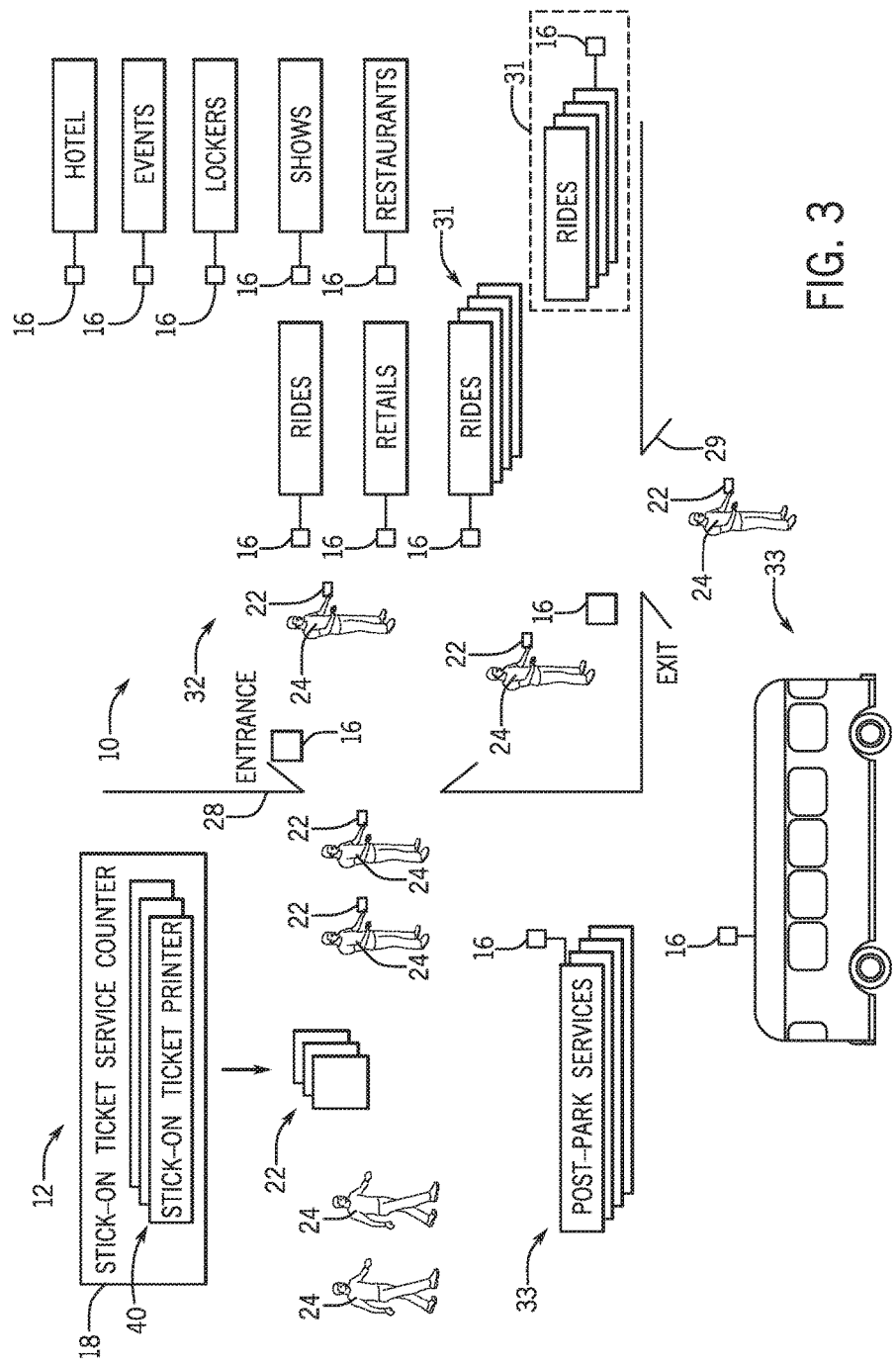
FIG. 3 is a schematic view of an embodiment of the stick-on ticket ticketing system of FIG. 1, illustrating using stick-on tickets inside and outside the amusement park, in accordance with present embodiments.

FIG. 3 is a schematic view of an embodiment of the stick-on ticket ticketing system 12 of FIG. 1, illustrating using the stick-on tickets 22 inside and outside the amusement park 10. The stick-on tickets 22 are activated or associated when an individual stick-on tickets 22 is associated with a particular user account or profile of the users 24. In particular, the stick-on ticket 22 is activated or associated when the barcode 54 of the stick-on ticket 22 is read by the barcode reader 50 to link the barcode 54 and the identification tag 58 of the individual stick-on ticket 22 to the corresponding user account, profile, and/or payment information. The users 24 may scan the stick-on tickets 22 at the stick-on ticket reader 16 by the entryway 28 to enter the amusement park 10. In one embodiment, upon entrance into the amusement park 10, the users 24 may have access to all amusement areas (e.g., rides, shows, entertainment events) that come with the admission to the amusement park 10. For example, the users 24 may not need to scan the stick-on tickets 22 to access amusement areas 32 that come with general admission into the amusement park 10. In some embodiments, the users 24 may scan the stick-on tickets 22 at the participating amusement areas 32 to gain access and/or promotions at the participating amusement areas 32. The participating amusement areas 32 may include rides, retail (e.g., vending machines, shops, souvenir shops), locker rooms, shows, events hotels, restaurants or food courts, etc. Further, in some embodiments, certain amusement areas 32 within the participating amusement areas 32 may have controlled access via stick-on tickets 22. The access to the controlled amusement areas 32 may be controlled for one-time or private events in a dynamic manner such that the control parameters may be changed depending on the particular access requirements of the day. That is, stick-on tickets 22 may facilitate a solution for providing access to only certain users 24 within the amusement park areas 32. In some embodiments, the user 24 may scan the stick-on tickets 22 at the stick-on ticket reader 16 by an exit 29 of the amusement park 10, such that the stick-on ticket ticketing system 12 recognizes that the user 24 has exited the amusement park 10. In some embodiments, upon exiting the amusement park 10, the user 24 may scan the stick-on tickets 22 to gain access and/or promotions at post-park services or facilities 33 outside the amusement park 10. For example, the post-park services 33 may include, but are not limited to, transportation services, shows, retails, and city tours.

Figure 4:
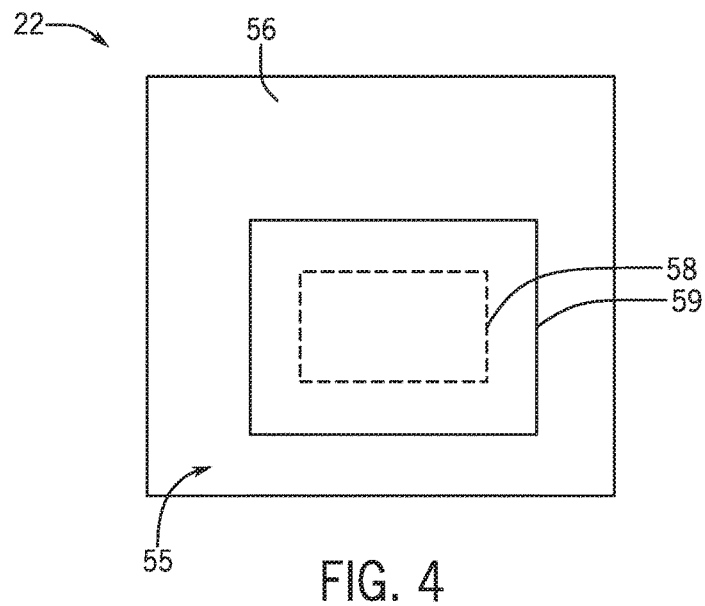
FIG. 4 is a top view of an embodiment of a stick-on ticket of the stick-on ticket ticketing system of FIG. 1, including a sticker adhered to a stick-on ticket carrier, in accordance with present embodiments.
Figure 5:
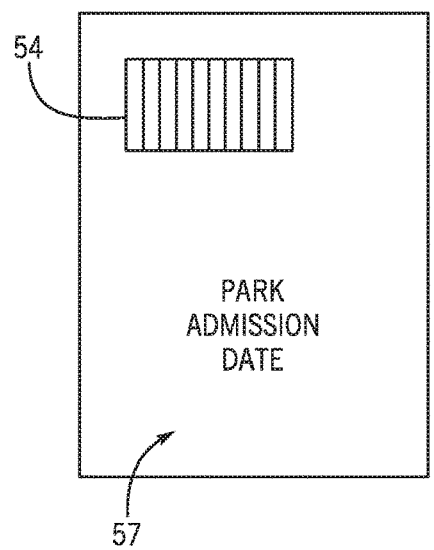
FIG. 5 is a bottom view of an embodiment of a stick-on ticket of the stick-on ticket ticketing system of FIG. 1, including a sticker adhered to a stick-on ticket carrier, in accordance with present embodiments.
Figure 6:
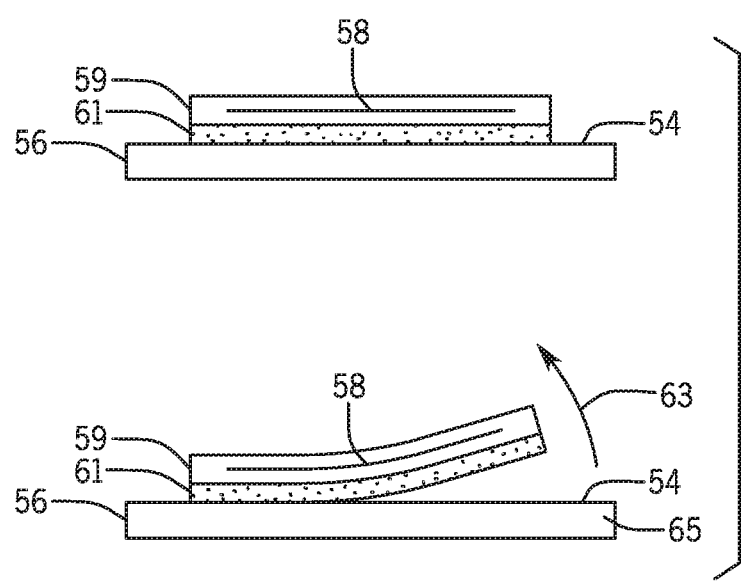
FIG. 6 is a side view illustrating an embodiment of removing the sticker from the stick-on ticket carrier of FIG. 4, in accordance with present embodiments.

FIGS. 4 and 5 are a top-view schematic diagram and a bottom-view schematic diagram of the stick-on ticket 22, respectively. FIG. 6 is a side-view schematic diagram of an embodiment of the stick-on ticket 22. Each individual stick-on ticket 22 includes a sticker 59, and an identification tag 58 is disposed on, integrated with, or embedded in the sticker 59. FIG. 4 shows the top surface 55 of a carrier 56, including a sticker 59 with an identification tag 58. The carrier 56 may be formed from suitable materials (e.g., sharkskin, plastic, polymers, fabric, paper) that permit communication with the identification tag 58, which may be embedded within or otherwise coupled to the sticker 59. As illustrated in FIG. 5, the rear or opposing surface 57 may be used for on-demand printing (ink or thermal printing) via the stick-on ticket printer and may carry the barcode 54 disposed on or printed on the stick-on ticket carrier 56. The opposing surface 57 may be formed from the same or different material relative to the top surface 55. Accordingly, while the stick-on ticket 22 may be provided as stock with certain elements present (the sticker 59, pre-printed designs on the top surface 55), other information may be printed on demand. While the depicted embodiment shows the barcode 54 on the opposing surface 57, it should be understood that the barcode 54 may additional or alternatively be printed on the top surface 55 (see FIG. 7).

The sticker 59 includes an adhesive 61 such that the sticker 59 is adhesive but peelable from the stick-on ticket carrier 56. The sticker 59 may be any suitable flexible material (e.g., paper, plastic), such that the sticker 59 conforms to a surface when adhered. The adhesive 61 may include any suitable adhesive material configured to adhere the sticker 59 to any suitable surface, e.g., a surface of a portion of the guest's body (e.g., hand, arm) or a surface of an object (e.g., mobile device, mobile phone, hand-held device, clothing, apparel and accessories). In some embodiments, the adhesive 61 may be a medical-grade adhesive. The stick-on ticket 22 may have any suitable shape (e.g., square, rectangle, circle, triangle, irregular shape). The stick-on ticket 22 may have any suitable design (e.g., shape, color, pattern) and may be sized to cover the entire top surface 55 or only a portion of the top surface 55.

In some embodiments, the stick-on ticket 22 may have shapes and/or designs according to a theme. In some embodiments, the stick-on ticket 22 may feature user-selectable designs. For example, a user may, at issuance, request one of a group of available designs (e.g., blue, yellow, red) or a stick-on ticket associated with a particular character. The stock may be provided that includes stock pre-printed with the available designs or characters and, based on the selection, the printer 40 may load the selected design stock from the inventory of stock to generate the appropriate stick-on ticket 22. Each individual type of design may also be associated with particular special entitlement or interactive park elements that, once the stick-on ticket 22 is activated, the user may have access to. For example, users that have selected a blue stick-on ticket 22 may find blue interactive elements throughout the park that are responsive to blue stick-on tickets 22 but not stick-on tickets 22 of other colors. In such embodiments, the barcode 54 and identification tag 58 may include information indicating the type of stick-on ticket design as well as the user information to facilitate such interactions.

The sticker 59 is configured to be peeled or removed, as indicated by an arrow 63, from the stick-on ticket carrier 56 and to be adhered to a suitable surface. In the depicted embodiment, the sticker 59 is implemented as a top layer positioned on the stick-on ticket carrier 56. However, it should be understood that the sticker 59 may be part of or formed from a layer including the stick-on ticket carrier 56 and may be peeled away from the carrier 56, leaving a remaining portion 65 of the stick-on ticket carrier 56 that includes release liner in the area of sticker 59 that is surrounded by the stick-on ticket carrier 56 and the barcode 54. In some embodiments, the top surface 55 may include a design or information feature (e.g., a puzzle clue, a reward code, coupon, special offer) that is revealed when the sticker 59 is removed to encourage use of the stickers 59.

Figure 7:
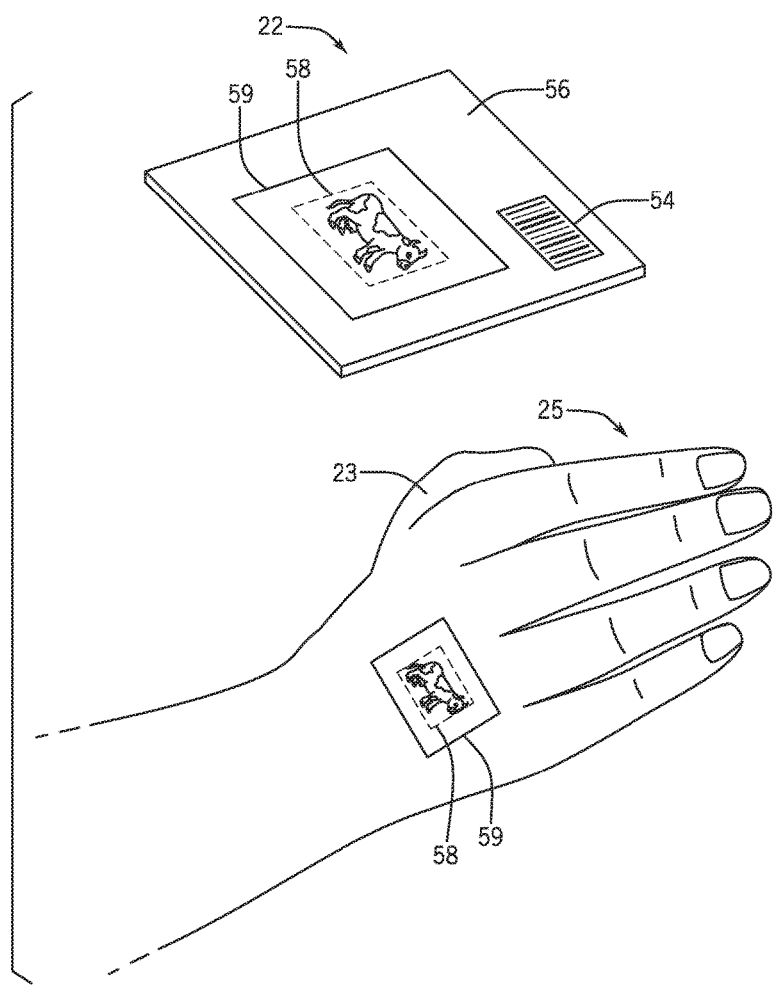
FIG. 7 is a perspective view illustrating an embodiment of adhering the sticker of FIGS. 4 and 5 on a surface, such as a hand, in accordance with present embodiments.

FIG. 7 is a schematic perspective view illustrating an embodiment of adhering the sticker 59 of FIGS. 4-6 on a surface 23, such as a hand 25. The sticker 59 may be configured to conform to the surface 23 with sufficient adhesion for a suitable period of time (e.g., minutes, hours). The sticker 59 may be configured to adhere to any other suitable portion of a body, such as an arm. The sticker 59 may be configured to adhere to any suitable object, such as clothes, hat, mobile device, and mobile phone.

Figure 8:
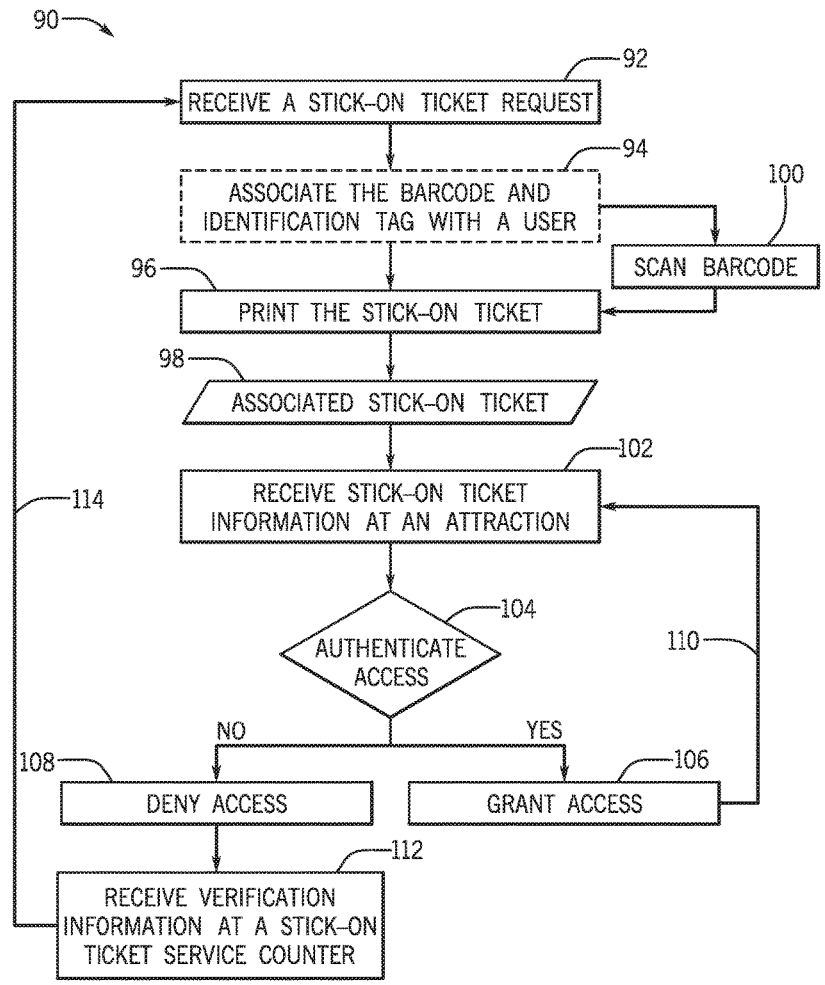
FIG. 8 is a flow chart of an embodiment of a method for operating the stick-on ticket ticking system of FIG. 1, in accordance with present embodiments.

FIG. 8 is a flow chart of an embodiment of a method 90 for operating the stick-on ticket ticking system of FIG. 1, in accordance with present embodiments. One or more of the steps of the method 90 stored in the memory 70 may be executed by the processor 72. Referring to the stick-on ticket ticketing system 12 of FIGS. 1, 2, and 3, the method 90 includes preparing (step 92) or generating a stick-on ticket. For example, upon receiving a request associated with valid information provided by a user 24 (e.g., payment information, user account information, user profile information) the stick-on ticket control system 14 may instruct the stick-on ticket printer 40 to generate a stick-on ticket 22 for the user 24. Preparation of the stick-on ticket printer 40 may include confirmation of loading the stick-on ticket carrier 56. Preparation of the stick-on ticket printer 40 may include printing a barcode 54 on the stick-on ticket carrier 56 (if the barcode 54 was not already on the stick-on ticket carrier 56). The stick-on ticket control system 14 may perform verification process based on rules of the verification instructions 78, and upon verification, instruct the stick-on ticket printer 40 to prepare for generating the stick-on ticket 22 for the user 24.

The method 90 includes associating (step 94) the stick-on ticket 22 with an individual user by associating the barcode and the identification tag with the same user. For example, the stick-on ticket control system 14 may instruct the stick-on ticket printer 40 to scan the barcode 54 on the stick-on ticket 22 using the barcode reader 50, such that the user account, user profile, and/or payment information may be linked or associated with the stick-on ticket 22 with the scanned barcode 54. Similarly, the printer 40 may read and/or write to the identification tag 58 to associate information on the identification tag 58 with the same user. Accordingly, the barcode 54 and the identification tag 58 are associated with the same user. The barcode 54 and the identification tag 58 may have the same or different codes. The method 90 includes printing (step 96) the stick-on ticket 22. Herein, the stick-on ticket 22 having the identification tag 58 and the scanned barcode 54 (e.g., the barcode 54 has been scanned for linking or associating the stick-on ticket 22 with the user account, profile, and/or payment information) is referred to as an associated stick-on ticket 98. In some embodiments, step 94 may be omitted, and subsequent to step 96, the method 90 includes scanning (step 100) the stick-on ticket 22 using a barcode reader after the stick-on ticket 22 has been printed. For example, the stick-on ticket control system 14 may receive the scanned barcode information from a mobile device (e.g., mobile phone or a smart phone having suitable application software) that function as the barcode reader 50.

The method 90 includes receiving (step 102) stick-on ticket information at an attraction (e.g., the amusement park 10 as a whole, various participating amusement park areas 32). For example, the stick-on ticket control system 14 may receive stick-on ticket information from the stick-on ticket reader 16 disposed by the entryway 28 (FIG. 1) and/or from the stick-on ticket readers 16 disposed at the participating amusement park areas 32 (e.g., locker facility, various rides and/or shows, restaurants or food courts, various retails or shops). The stick-on ticket reader 16 may include one or both of an identification tag reader (e.g., an RFID reader) and an optical reader to read identification tag information and bar code information, respectively. The method 90 includes authenticating (step 104) access based on the stick-on ticket information received at step 102. In response to determining that the associated stick-on ticket 98 is a valid pass for the particular attraction, the method 90 includes granting (step 106) access to the particular attraction. For example, the stick-on ticket control system 14 may instruct the corresponding one or more entry control mechanisms 43 to allow admission to the particular attraction. In response to determining that the associated stick-on ticket 98 is an invalid pass for the particular attraction, the method 90 includes denying (step 108) access to the particular attraction. The steps 102, 104, and 106 may be repeated multiple times as indicated by an arrow 110. For example, the stick-on ticket control system 14 may receive stick-on ticket information multiple times as the user 24 uses the stick-on ticket 22 to access the same attraction multiple times and/or to access different attractions at different times.

In some cases, the access into an attraction may be denied due to a lost stick-on ticket 22 or a stick-on ticket 22 that does not function properly. In these cases, the user 24 may seek assistance from the stick-on ticket service counter 18 (e.g., kiosks 19, service counters 20 providing in-person customer services). As such, the method 90 includes receiving (step 112) verification information at the stick-on ticket service counter 18 and the method 90 proceeds back to step 92 as indicated by an arrow 114 to generate a replacement stick-on ticket 22 for the user 24. The verification information received at the stick-on ticket service counter 18 may include a proof of identification, a proof of purchase of the stick-on ticket 22, the barcode 54 of the stick-on ticket, or other suitable information to verify ownership of the stick-on ticket 22.

Because of the redundancy offered by the barcode 54 and the identification tag 58, the stick-on ticket control system 14 is configured to prevent transfer of one portion of the stick-on ticket 22 to another individual to gain access to the amusement park and/or amusement park attractions. For example, in cases that the information from the barcode 54 and the information from the identification tag 58 are received from two different locations, the stick-on ticket control system 14 may instruct the corresponding entry control mechanisms 43 to withhold admission to the associated particular attractions until ownership of the stick-on ticket 22 is verified. Upon verification of the ownership, the stick-on ticket control system 14 may instruct the entry control mechanisms 43 to invalidate the invalid entry request. Accordingly, access via information read from the barcode 54 will invalidate simultaneous access based on information read from the identification tag 58 from the same stick-on ticket 22, and vice versa. That is, only one portion of the stick-on ticket 22 (barcode 54 or identification tag 58) may be used to gain access at any one time.

Figure 9:
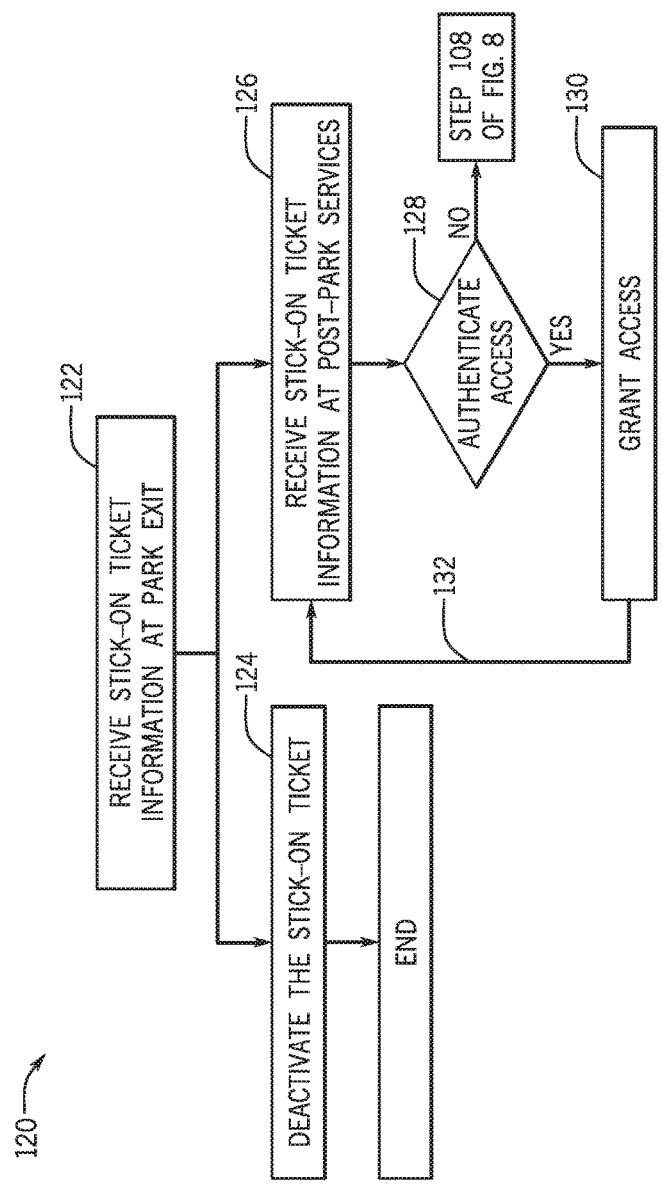
FIG. 9 is a flow chart of an embodiment of a method for operating the stick-on ticket ticking system of FIG. 1, in accordance with present embodiments.

FIG. 9 is a flow chart of another embodiment of a method 120 for operating the stick-on ticket ticking system of FIG. 1, in accordance with present embodiments. One or more of the steps of the method 120 stored in the memory 70 may be executed by the processor 72. Referring to the stick-on ticket ticketing system 12 of FIGS. 1, 2, and 3, the method 90 includes receiving (step 122) stick-on ticket information at a park exit. For example, the stick-on ticket control system 14 may receive stick-on ticket information from the stick-on ticket reader 16 disposed by the exit 29 of the amusement park 10 (FIG. 3) indicating that the user 24 has exited the amusement park 10. In some embodiments, the method 120 includes deactivating or de-associating (step 124) the stick-on ticket 22 in response to the user 24 exiting the amusement park 10. In an embodiment, the deactivated stock-on ticket 22 may be deactivated upon expiration of a purchase entitlement, e.g., at the end of the day. For example, a user may purchase an entitlement for a particular day. Upon park closure at the end of the day, the stick-on ticket control system 14 is updated such that all expired stick-on tickets 22 are no longer entitled to admission. A deactivated or de-associated stick-on ticket 22 can no longer be used to access to the amusement park 10 and/or the various participating amusement areas 32. In some embodiments, step 122 may be omitted and the stick-on ticket control system 14 may deactivate or de-associate the stick-on tickets 22 according to one or more of the rules of the verification instructions 78 (FIG. 2). For example, the stick-on ticket control system 14 may deactivate or de-associate the stick-on tickets 22 at a pre-determined time. The pre-determined time may be a time period (e.g., hours, days) from the time of purchasing the stick-on ticket 22, a time period (e.g., hours, days) from the time of the first usage (e.g., read by the stick-on ticket reader 16) of the stick-on ticket 22, at closing of the amusement park 10, or at the end of the day. In some embodiments, the method 120 includes receiving (step 126) stick-on ticket information at post-park services 33. For example, the stick-on ticket control system 14 may receive stick-on ticket information from the stick-on ticket reader 16 disposed at the post-park services 33 (e.g., transportation services, shows, retails, and city tours). The method 120 includes authenticating (step 128) access based on the stick-on ticket information received at step 126. In response to determining that the stick-on ticket 22 is a valid pass for the particular post-park service 33, the method 120 includes granting (step 130) access to the particular post park service 33. For example, the stick-on ticket control system 14 may instruct the corresponding one or more entry control mechanisms 43 to allow admission to the particular post-park service 33. In response to determining that the stick-on ticket 22 is an invalid pass for the particular attraction, the method 120 proceeds to step 108 of FIG. 8. Steps 126, 128, and 130 may be repeated multiple times as indicated by an arrow 132. For example, the stick-on ticket control system 14 may receive stick-on ticket information multiple times as the user 24 uses the stick-on ticket 22 to access the same post-park service 33 multiple times and/or to access different post-park services 33 at different times.

Figure 10:
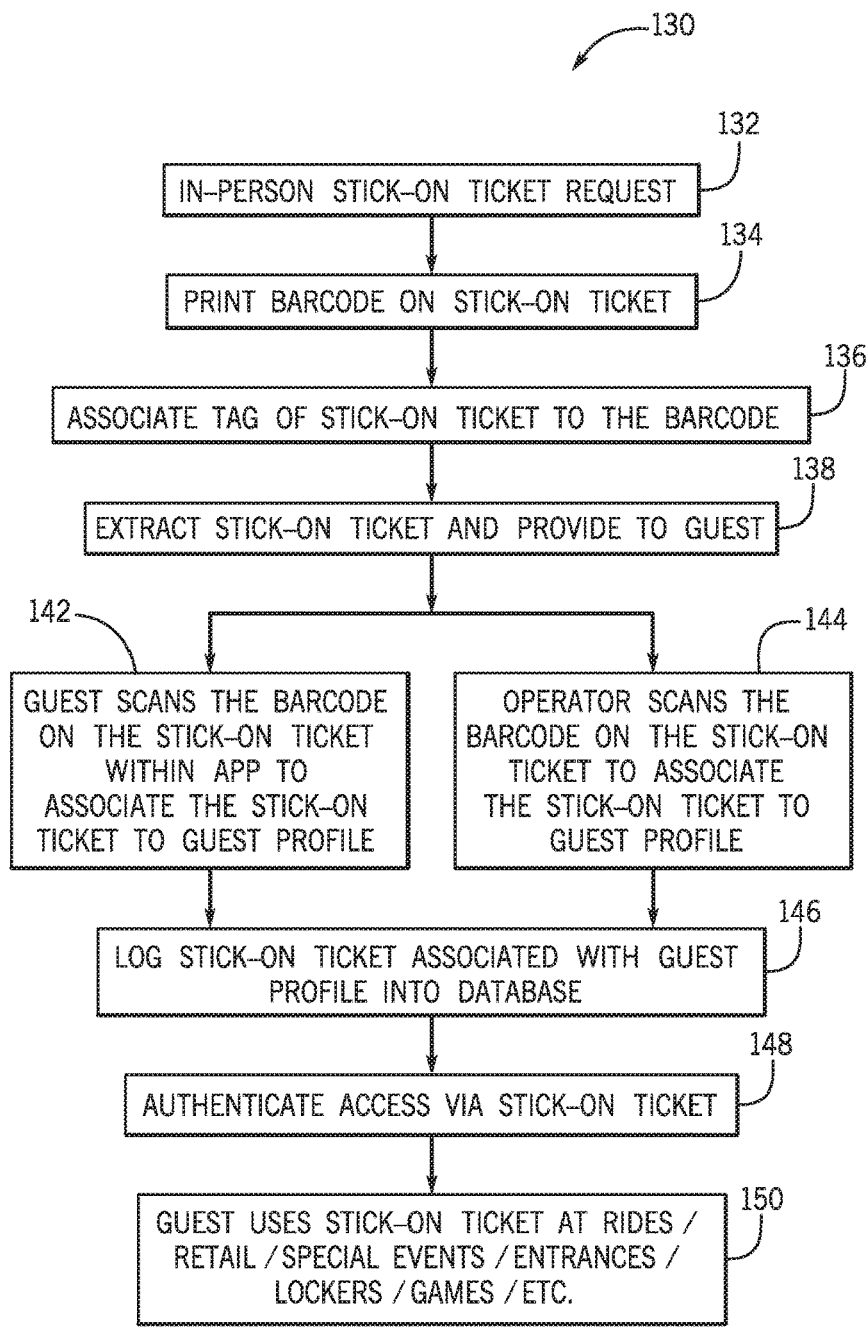
FIG. 10 is a flow chart of an embodiment of a method for operating the stick-on ticket ticking system of FIG. 1, in accordance with present embodiments.

FIG. 10 is a flow chart of an embodiment of a method 130 for operating the stick-on ticket ticking system of FIG. 1, in accordance with present embodiments. One or more of the steps of the method 130 stored in the memory 70 may be executed by the processor 72. Referring to the stick-on ticket ticketing system 12 of FIGS. 1, 2, and 3, the method 130 includes receiving an in-person a stick-on ticket request (block 132), which causes the stick-on ticket control system 14 to instruct the stick-on ticket printer 40 to prepare a stick-on ticket 22 for the user 24. Preparation of the stick-on ticket printer 40 may include printing a barcode 54 on the stick-on ticket carrier 56 (if the barcode 54 was not already on the stick-on ticket carrier 56) (block 134). The method 130 includes associating (step 136) the barcode 54 of the stick-on ticket 22 with the tag of the stick-on ticket 22 by reading the tag within the printer 40 using an internal reader 52. The method 130 may either access the printing information stored in the printer 40 to obtain the barcode or may read the printed barcode 54. Accordingly, the barcode 54 and the identification tag 58 are associated with the same stick-on ticket. The barcode information and the tag information may be stored in the stick-on ticket control system 14. The stick-on ticket 22 is extracted from the printer 40 and provided to the guest or user 24 (block 138). The stick-on ticket 22 may then by manually associated by an operator (using a barcode reader and with access to the stick-on ticket control system 14) associating the guest name and associated profile and account information with the stick-on ticket 22 (block 144). The stick-on ticket 22 may also be associated with an application operating on a mobile device that permits the user 24 to scant the barcode 54 and/or read the identification tag 58. Once read, the application automatically associates the user 24 with the scanned stick-on ticket 22 and communicates the association to the stick-on ticket control system 14 (block 142). The stick-on ticket control system 14 logs the association, including the user information and the stick-on ticket information, into a database (block 146). Once logged, the stick-on ticket 22 is authenticated (block 148) for use within the amusement park 10 as provided herein (block 150).

Figure 11:
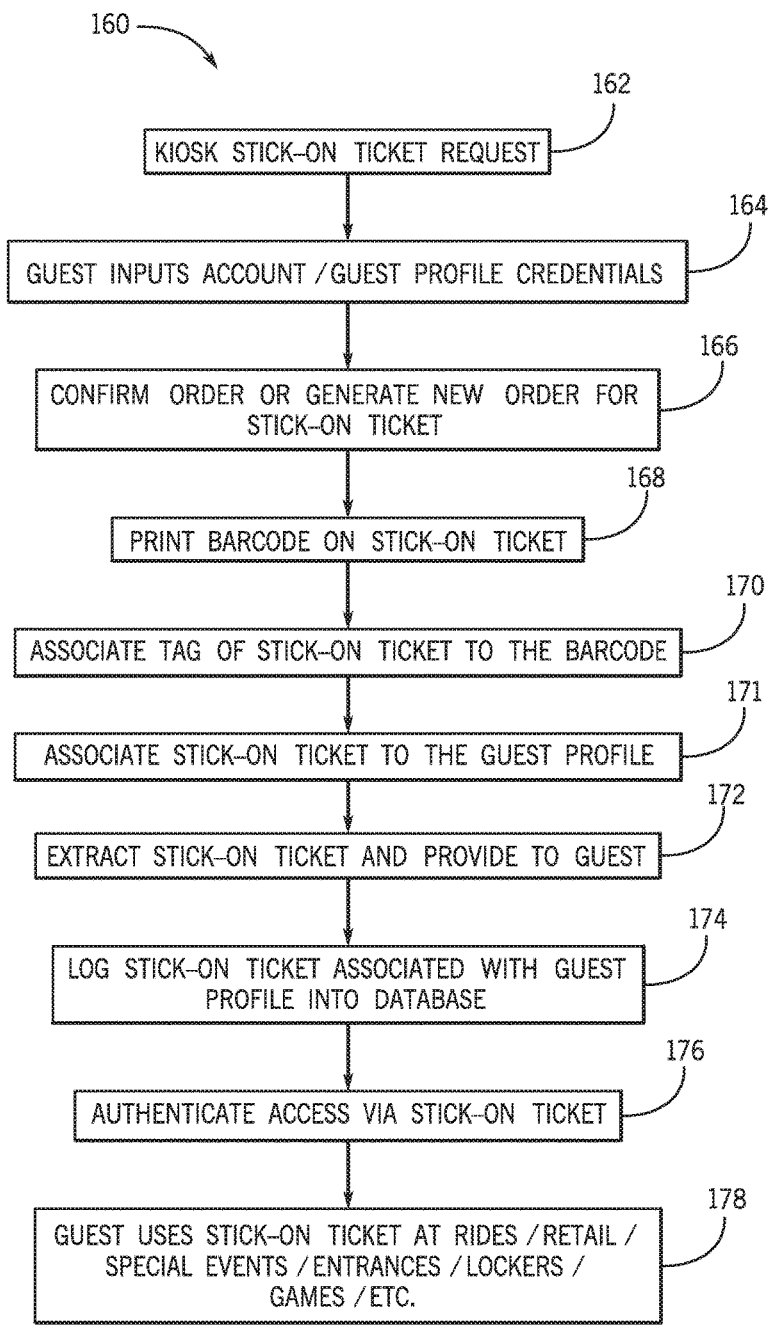
FIG. 11 is a flow chart of an embodiment of a method for operating the stick-on ticket ticking system of FIG. 1, in accordance with present embodiments.

FIG. 11 is a flow chart of an embodiment of a method 160 for operating the stick-on ticket ticking system of FIG. 1, in accordance with present embodiments. One or more of the steps of the method 160 stored in the memory 70 may be executed by the processor 72. Referring to the stick-on ticket ticketing system 12 of FIGS. 1, 2, and 3, the method 160 includes receiving a stick-on ticket request (block 162) from a kiosk. The request includes or provides a prompt for guest information entry (block 164), which may be manually input or may be provided by scanning a code displayed within an application operating on a mobile device. The stick-on ticket control system 14 determines whether an existing order has been made or generates a new order (block 166), which causes the stick-on ticket control system 14 to instruct the stick-on ticket printer 40 to prepare a stick-on ticket 22 for the user 24. Preparation of the stick-on ticket printer 40 may include printing a barcode 54 on the stick-on ticket carrier 56 (if the barcode 54 was not already on the stick-on ticket carrier 56) (block 168). The method 130 includes associating (step 170) the barcode 54 of the stick-on ticket 22 with the tag of the stick-on ticket 22 by reading the tag within the printer 40 using an internal reader 52. The method 130 may either access the printing information stored in the printer 40 to obtain the barcode or may read the printed barcode 54. Accordingly, the barcode 54 and the identification tag 58 are associated with the same stick-on ticket. The barcode information and the tag information may be stored in the stick-on ticket control system 14. The stick-on ticket 22 is further associated with the guest profile (block 171). The stick-on ticket 22 is extracted from the printer 40 and provided to the guest or user 24 (block 172). The stick-on ticket control system 14 logs the association of the stick-on ticket, including the user information and the stick-on ticket information, into a database (block 174). Once logged, the stick-on ticket 22 is authenticated (block 176) for use within the amusement park 10 as provided herein (block 178).

In addition, in certain embodiments, certain steps of obtaining and/or associating the stick-on ticket 22 may be performed in advance by the user 24. For example, the user 24 may, in anticipation of an upcoming trip, use a web browser interface to request a stick-on ticket 22. If not already present, the user 24 creates a guest profile including account information. The guest profile is then associated with a stick-on ticket request. The request is then routed to a stick-on ticket printer 40, which prepares the stick-on ticket 22 and associates the stick-on ticket 22 with the user 24, e.g., according to certain steps of the methods in FIGS. 10 and 11, and then mails the stick-on ticket 22 to the user 24 or provides the stick-on ticket 22 as available for pick up at the amusement park 10.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A ticketing system, comprising:
a stick-on ticket comprising:
a stick-on ticket carrier;
a sticker comprising an identification tag and an adhesive layer, wherein the sticker is configured to be removable from the stick-on ticket carrier and adhered to another surface; and
a barcode comprising barcode information disposed on the stick-on ticket carrier on a carrier region of the stick-on ticket carrier not covered by the sticker when the sticker is disposed on the stick-on ticket carrier;
one or more stick-on ticket printers, each stick-on ticket printer configured to associate the barcode information with a user account and print the barcode on the carrier region on demand in response to a stick-on ticket request, wherein each stick-on ticket printer comprises:
an identification tag reader configured to read identification tag information from the identification tag, write identification tag information to the identification tag, or a combination thereof, to associate the identification tag with the user account such that the barcode and the identification tag are associated with the same user account; and
communication circuitry configured to communicate the barcode information and the identification tag information; and
a stick-on ticket control system coupled to the one or more stick-on ticket printers wherein the stick-on ticket control system stores instructions that, when executed, are configured to cause the stick-on ticket control system to:
receive the barcode information and the identification tag information from the one or more stick-on ticket printers;
store the barcode information and the identification tag information in association with the user account;
receive the barcode information or the identification tag information from a stick-on ticket reader associated with an amusement park; and
authenticate access to the amusement park based at least in part on the barcode information or the identification tag information read by the stick-on ticket reader.

2. The ticketing system of claim 1, comprising a barcode reader integrated within the one or more stick-on ticket printers to read the barcode information from the barcode.

3. The ticketing system of claim 1, comprising a barcode reader configured to read the barcode information from the barcode, wherein the barcode reader comprises a mobile or hand-held device.

4. The ticketing system of claim 1, wherein the instructions, when executed, cause the stick-on ticket control system to authenticate access based on only one of the barcode information or the identification tag information.

5. The ticketing system of claim 1, wherein the instructions, when executed, cause the stick-on ticket control system to authenticate access to one or more post-park services outside the amusement park.

6. The ticketing system of claim 1, wherein the instructions, when executed, cause the stick-on ticket control system to authenticate ownership of the stick-on ticket, and in response to authenticating the ownership of the stick-on ticket, generate a replacement stick-on ticket.

7. The ticketing system of claim 1, wherein the instructions, when executed, cause the stick-on ticket control system to deactivate the stick-on ticket at a pre-determined time.

8. The ticketing system of claim 1, wherein the identification tag stores information related to a stick-on ticket design.

9. A method of ticketing, comprising:
receiving a stick-on ticket request for a stick-on ticket, wherein the stick-on ticket comprises a sticker and a carrier region not covered by the sticker;
printing a barcode onto the carrier region on demand in response to the stick-on ticket request;
associating the barcode and an identification tag of the sticker of the stick-on ticket with a user to generate an associated stick-on ticket;
providing the associated stick-on ticket to the user;
reading information from the associated stick-on ticket at an attraction, wherein the information is associated with the user; and
authenticating access to the attraction based at least in part on the information.

10. The method of claim 9, wherein associating the user with the barcode comprises scanning the barcode using a barcode reader communicatively coupled to a stick-on ticket printer.

11. The method of claim 9, wherein associating the stick-on ticket with the barcode comprises scanning the barcode using a mobile device.

12. The method of claim 9, wherein reading the information from the associated stick-on ticket comprises reading information from the barcode.

13. The method of claim 9, wherein reading the information from the associated stick-on ticket comprises reading information from the identification tag of the sticker.

14. The method of claim 9, comprising reading second information from a different portion of the associated stick-on ticket after the authenticating and not validating access to the attraction.

15. The method of claim 14, wherein the second information is from the barcode.

16. A stick-on ticket printer configured to print stick-on tickets, the stick-on ticket printer comprising:
a printer configured to print a barcode comprising barcode information on a stick-on ticket carrier comprising a sticker and a carrier region outside of a perimeter of the sticker or on an opposing surface of the stick-on ticket carrier, wherein the printer is configured to print the barcode on the carrier region on demand in response to a stick-on ticket request;
an identification tag reader configured to read an identification tag of the sticker associated with the stick-on ticket carrier to acquire identification tag information;
a processor configured to receive user information and associate the user information with the barcode information and the identification tag information to generate stick-on ticket information; and communication circuitry configured to send the stick-on ticket information to a stick-on ticket control system.

17. The stick-on ticket printer of claim 16, wherein the identification tag reader comprises a radio frequency identification (RFID) tag reader.

18. The stick-on ticket printer of claim 16, wherein the identification tag reader comprises near field communication (NFC) tag reader.

19. The stick-on ticket printer of claim 16, comprising a barcode reader configured to read the barcode to acquire the barcode information, wherein the barcode reader comprises an optical reader.

20. The stick-on ticket printer of claim 16, comprising a user interface configured to permit entry of the user information.

* * * * *